United States Patent Office 2,792,299
Patented May 14, 1957

2,792,299

PROCESS FOR SMELTING OF ORES TO RECOVER IRON

Roy A. Halversen, Dearborn, Mich.

No Drawing. Application May 14, 1953,
Serial No. 355,190

4 Claims. (Cl. 75—41)

This invention relates to the smelting of ores, more particularly to the reduction of iron ore to produce metallic iron of high quality.

The recovery of iron from its naturally occurring ores is almost universally carried out by reduction of the oxide to the metal. Many iron ores occur naturally in the form of iron oxides. Most of the others, such as the carbonates and sulfides, which are utilized commercially are generally roasted in free contact with the air which drives off carbon dioxide and sulfur, respectively, and converts the iron to its oxide. The suitability of naturally occurring iron oxides, and of those obtainable by roasting the naturally occurring non-oxide ores, vary considerably in their value for the production of iron because of the differences in the ease with which they can be reduced to the metal depending, principally, upon the nature and proportion of other substances present. Such reductions are almost always accomplished in a blast furnace or, to some extent, in an open hearth furnace, wherein the actual reducing agent is principally carbon monoxide obtained by the combustion of carbon, generally in the form of metallurgical coke. The carbon, together with limestone as a fluxing agent, is generally mixed with the ore prior to or during its introduction into the furnace.

In the conventional operation of a blast furnace, and in other operations involving the production and purification of iron, provision must be made for separating the impurities occurring in the ore from the liquid metallic iron produced. Such impurities may consist of clay and other earthy substances generally in the nature of complex silicates, aluminates and the like and may also include considerable proportions of compounds of other heavy metals. Sulfur-, silicon- and phosphorus-containing compounds are generally present in the ore, or may be introduced along with carbon in the form of coke, and especial care must be exercised to rid the iron of these harmful substances when the iron is to be used for many purposes. The separation of certain of such substances from the molten iron is usually effected by including with the ore and carbon charged into the furnace a considerable proportion of limestone. During the course of the operation, the limestone is decomposed to form carbon dioxide and lime and the latter combines with the various silicates, aluminates and certain of the other non-ferrous ingredients of the charge to form a molten slag which drips downward in the furnace along with the molten iron and eventually settles in the bottom of the furnace as a molten layer floating on the molten iron. The liquid slag and the liquid iron are periodically drawn off separately from the lower part of the furnace. The liquid iron is cast into pigs or utilized in any desirable manner, as in the making of steel, and the slag is disposed of in any convenient way. Carbon dioxide evolved from the limestone is converted upon contact with the hot carbon to carbon monoxide and this, together with that formed by combustion of the carbon, serves as the effective reducing agent to reduce the ore to metal.

Iron produced in a blast furnace is relatively impure and must be further refined for many uses, particularly for making steel. The unsuitableness for many purposes of steels containing excessive quantities of phosphorus, sulfur or silicon is well known as are also the conventional methods employed for removing these impurities utilizing the Bessemer converter, the open hearth furnace and the electric furnace. Phosphorus, silicon and sulfur are generally present in pig iron in proportions greater than can be tolerated for many subsequent uses of the iron.

In most instances the presence of a compound of a heavy metal other than iron in an ore which is to be smelted does not give rise to too great difficulties. During the smelting operation the other metal will either be reduced to its elemental state and recovered as an ingredient of the molten iron or it will appear as a compound in the slag. In the event, however, that the ore contains more than a very small proportion of titanium, it is found that the melting point of the slag is so high that it can be drawn from the furnace as a liquid only with great difficulty or not at all. This may be due to the presence of calcium titanates, titanium carbides, titanium cyanides or other titanium compounds as very high-melting components of the slag. Unfortunately, many deposits of otherwise excellent iron ores, especially oxide ores, are contaminated with sufficient titanium to cause them to be practically unworkable in the conventional operation of a blast furnace or open hearth furnace, or in any process which depends upon the formation of a liquid slag. Ilmenite, for example, occurs in large quantities in readily accessible locations but contains such a large proportion of titanium that it is impossible to reduce the iron to metal in a blast furnace on account of the difficulties mentioned. It is generally considered that iron ores containing more than about one percent of titanium are unworkable in a blast furnace.

The same difficulties, especially with respect to titaniferous ores, are encountered in the operation of the open hearth furnace following conventional procedures. The open hearth furnace, although used primarily for the refining of pig iron, is a significant producer of iron direct from its ores because a certain amount of limestone and iron ore is generally charged into the furnace along with the molten pig. The presence of more than a small proportion of titanium in the ore results in the formation of a high-melting slag from which it is difficult to separate the iron or steel. Although the open hearth furnace can be operated so as to reduce the proportion of silicon, phosphorus and sulfur, especially the proportion of phosphorus, in the final product, as compared with the proportion of these substances generally present in pig iron, the time required is excessive, often amounting to from six to ten hours per charge.

It is apparent that a method or process whereby iron ores containing a high proportion of titanium could be reduced to metal in a blast or open hearth furnace would be of great value. The value of such a method would be further enhanced if, at the same time, the proportion of silicon, sulfur and phosphorus in the pig iron produced by the blast furnace were materially less than those normally present in pig iron produced by conventional procedures.

It has now been found, and is herein first disclosed, that many of the above difficulties encountered in the reduction of iron ores, especially of titaniferous ores, can be overcome readily by replacing a part or all of the limestone ordinarily used as a fluxing agent with an alkali metal halide from the group consisting of the alkali metal chlorides, bromides and iodides, preferably with ordinary salt or sodium chloride. It has been found that this leads to the formation of a lower melting slag than that formed when using limestone. Any available grade of reasonably pure salt can be used, such as rock salt, salt recovered from brines and that obtained from sea water by solar evaporation. Such grades of salt generally contain not more than a small proportion of impurities, such as calcium and magnesium chlorides, which do not interfere with the operation of the process. It is apparent that from economic considerations the process will practically always be carried out using sodium chloride as the alkali metal halide even though other alkali metal halides, including potassium chloride or bromide, sodium iodide and the lithium halides can, if desired, be used and the invention will be described with particular respect to sodium chloride. The terms "halogen" and "halide" as used herein exclude fluorine and the fluorides.

It is thought that the effectiveness of the sodium chloride in producing a low-melting slag depends upon the oxidation of the compound in the hot oxidizing region within the furnace to a sodium oxide or to some other highly basic oxythermal decomposition product of the sodium chloride, e. g. a mixture of oxide and hydroxide, which then reacts with the non-ferrous constituents of the ore to form a sodium base slag of lower melting point that the corresponding calcium base slag. It has not been determined whether, under the conditions prevailing in the blast furnace, the alkali metal oxides are converted to other highly basic alkali metal compounds, but it is thought that this may occur to some extent. The term "oxythermal decomposition product" as used herein includes any such product which may be formed in addition to an alkali metal oxide and includes hydroxides which may be formed to some extent if appreciable amounts of water are present in the ore or in the air.

It is advantageous and preferred to introduce the sodium chloride into the furnace at a point near the surface of the layer of molten slag to insure its being subjected to the most vigorous oxidizing conditions prevailing in the furnace. The temperature in this region of a blast furnace operating under normal conditions is generally between about 1500 and 2000 degrees C. At this temperature the sodium chloride, which boils at about 1413 degrees C., is vaporized rapidly. In addition, the vaporization occurs in a highly effective oxidizing zone, due to the introduction of the air supply into the same region, and the oxythermal decomposition of the halide is thereby promoted rapidly. It should be noted, also, that at the temperatures prevailing in the oxidation zone immediately above the layer of liquid slag, sodium oxide exists in the vapor phase and is, therefore, in the best possible form to effect immediate and intimate contact with slag-forming constituents of the ore thus promoting its instantaneous reaction therewith. This is in contrast to the action of calcium oxide which has only a very low vapor pressure at the temperature involved and fluxing therewith must await actual contact of the lime and the slag-forming constituents.

An additional advantage of introducing the new fluxing agent into the oxidizing zone rather than at a higher level is that there is thus afforded a better opportunity for the titanium to be converted to slag. Once the titanium is reduced to the free metal there is a considerable tendency for it to be converted in the presence of carbon and nitrogen to the highly infusible carbide, cyanide and nitride which do not react with the fluxing agent as readily as does the oxide.

The introduction of sodium chloride into a blast furnace can be accomplished in a number of ways. One convenient way comprises grinding it and introducing it along with the air blast. In an alternative procedure the molten salt can be atomized or distilled into the air stream. When the temperature of the air stream is below the melting point of the salt the latter first solidifies in the form of an extremely finely divided suspended powder or dust and as such follows the air stream faithfully throughout the entire charge thus promoting rapid fusing and oxidation of the salt and fluxing of the non-ferrous substances. Alternatively, separate conduits of suitable construction can be employed for introducing the salt in solid, liquid or vapor form.

It is important to note that, since the temperature throughout the oxidizing zone of the furnace, and for some distance above the zone, is generally higher than the boiling point of sodium chloride, the desired effect is obtained less readily by introducing the sodium chloride through the hopper at the top of the furnace along with the rest of the charge. Under such conditions, the tendency is for the sodium chloride to be vaporized before it reaches the oxidation zone and thereafter for most of it to reflux over a narrow vertical band within the furnace and never to be subjected to the maximum temperature or the maximum oxidizing conditions prevailing in the furnace. Such a situation is obviously undesirable and should be avoided.

As mentioned previously, the proportion of sodium chloride used can be varied over substantial limits to provide a slag having desired melting point characteristics. Generally speaking, the proportion of limestone used is reduced by an amount approximately chemically equivalent to the salt used. In the case of ores relatively low in titanium it is often sufficient to thus replace from 5 to 25 per cent of the limestone which would otherwise be used in smelting the ore with salt and still to obtain a slag which is sufficiently liquid to permit efficient operation of the furnace. In the case of ores containing a relatively high proportion of titanium, such as ilmenite, the amount of sodium chloride used can be increased, as desired, and under certain conditions it may be desirable to use an amount equivalent chemically to substantially all of the limestone which would normally be used in attempting to smelt such an ore. It is thought that the formation of eutectic mixtures of sodium base and calcium base compounds in the slag may also be of some influence in lowering the melting point of the latter.

The reduction of the proportion of limestone in the charge is also advantageous in that it provides for a greater charging rate to the furnace of both coke and ore and thus increases appreciably the capacity of the furnace per unit of time operated. In processing ores high in silica, it may be desirable to replace substantially all of the limestone with the new fluxing agent to avoid the formation of appreciable quantities of the highly infusible calcium silicates.

It should be noted, also, that there are other advantages accruing to the use of the alkali metal halides as slag-forming agents. The evolved halogen moves upward in the furnace into contact with the hot carbon and slag-forming substances. Due to the high reactivity of halogens at these temperatures, a number of valuable by-products may be formed and recovered from the gases leaving the furnace. These include carbon chlorides of various sorts, certain halohydrocarbons, especially when there are volatiles present with the coke, phosgene, phosphorus oxychloride, silicon tetrachloride, silicon trichloride, ($Si_2Cl_6$), titanium tetrachloride and other substances. Under certain conditions elemental chlorine is swept out of the furnace in the gas stream and can be recovered in any convenient manner. Recovery of non-volatiles from the stack, e. g. by Cottrell precipitation, furnishes a ready means for their recovery.

Although the invention is of particular value in the reduction of titaniferous iron ores, it is pointed out that it is also of value in the reduction of many ores which are low in iron content and high in sulfur, phosphorus and slag-forming constituents even though they are low in titanium content. Ore containing as much as 30 to 40 percent or more of apatite can be smelted satisfactorily using the method of the invention with the production of a good grade of pig iron. Such ores have generally heretofore been concentrated, e. g. by grinding and subsequent filotation or magnetic separation processes, prior to smelting. Sintering of the finely ground concentrate and breaking up of the clinker is generally necessary to form a charge which will provide the necessary air channels through it and which will not be blown out of the furnace as dust in the gas stream. When such ores, or the fines recovered therefrom, are pelleted with sodium chloride the pellets can be used satisfactorily as furnace charging stock. The lower melting character of the slag produced, as compared with conventional processes, permits the utilization of such ores of low iron content because of the ease of handling of the larger proportionate quantity of slag produced. The more alkaline character of the fluxing material, as compared with lime, and its generally greater volatility and, therefore, better contacting of all parts of the charge, promotes extremely rapid removal of sulfur, phosphorus, titanium and silicon from the iron.

It is also to be noted that, because of the more alkaline character of the slag formed using the new fluxing agents as compared with limestone, and also because of their higher volatility, they are used advantageously in the open hearth furnace, the Bessemer converter and the electric furnace to promote the more rapid removal of sulfur, phosphorus, titanium, silica, and of other acidic constituents, from the iron thus leading to the production of high quality steel quickly and with a minimum loss of iron. For application in the open hearth furnace a pelleted or sintered mixture of ore fines and sodium chloride can be used to advantage and added, especially during the oxidizing part of the operation. The application of the process to the melting of iron in the cupola is also advantageous because it furnishes a ready means for reducing the silicon, sulfur and phosphorus content during the melting operation.

The invention is also of advantage in that it is well adapted for use in reduction of ores using gas and oil as fuel in regions where coke and limestone are either unavoidable or must be shipped long distances. Many regions which are deficient in coal and limestone contain salt, ore and gas or oil in closely neighboring locations so that, by employing these fuels and the new fluxing agents to replace at least a part of the coke and limestone, the cost of iron production in such regions is lowered materially.

Certain advantages of the invention are apparent from the following example which is given by way of illustration only and is not to be construed as limiting.

EXAMPLE

A cupola furnace (Whiting model) having an internal diameter of about 20 inches and about 12 feet high was used in carrying out the following operations. The cupola was charged with coke and brought slowly to temperature in the usual manner. Three portions of scrap iron (charge Nos. 1, 2 and 3) and of coke were then added as a "soaking" charge. When the scrap was thoroughly melted the furnace was charged periodically (about every six minutes) with coke, iron ore, scrap iron and limestone as given, together with the character and analysis of the ore in each charge, in the accompanying Table I.

The coke used was in pieces having an average diameter of about 1 to 2 inches. It had an estimated ash content of 10 percent.

The limestone used was in pieces having an average diameter of about 1 to 1.5 inches.

The iron ore was, except in charge No. 19, in pieces having an average diameter of about 0.5 to 1 inch.

The scrap iron had an average phosphorus content of about .03 percent, the highest value being 0.6 percent. It had an average sulfur content of about 0.15 percent.

The cupola was operated with an air input through the bustle at the rate of about 338 cu. ft./min. during the initial charging. The rate was varied between this value and 280 cu. ft./min. during the first nine charging operations. It was then dropped to 170 cu. ft./min. until near the end of the operating period and then increased to 260 cu. ft./min. for the balance of the period.

Beginning with the third charging of the furnace (the first charge using iron ore) powdered sodium chloride was fed into the cupola by running it from a container through an orifice into the air stream just prior to its entering the cupola. The rate of salt addition was adjusted so that 2.4 lb. was added for each charge of 18 lb. of iron ore. The only exception to this was that 5 lb. of soda ash instead of salt was added over a period of about 13 minutes when charges 14 and 15 were in the reducing zone of the cupola. The total amount of sodium chloride used was 42 lb.

During the entire operation the slag temperature at the draw off was 2370 to 2610 degrees F., the metal temperature at the draw off was 2370 degrees to 2725 degrees F., and the furnace temperature at the level of the tuyere was 2660 degrees to 2750 degrees F.

Slag was tapped periodically from the cupola, a total weight of 251 lb. being obtained. The slag flowed readily and freely from the cupola through a one-inch tap hole at each draw off. The cold slag was a hard, shiny black solid. It contained about 70 lb. of occluded iron in the form of pellets of irregular size because of the short length of the furnace and the inadequate settling period possible to provide. The slag when ground and mixed with water gave an alkaline reaction and a salty taste. No slag adhered to the walls of the cupola.

The iron was tapped from the cupola in 16 different pours of approximately equal weight. The pours were cast into ingots, the total weight of ingots being 530 lb. and the average weight of each pour being 33.1 lb. Samples of the iron of about one-half pound each were taken after the 1st, 5th, 7th, 9th, 10th, 11th, 12th, 13th, 14th, 15th and 16th pours, the samples being numbered 1 to 11, consecutively. Five pounds of iron was contained in the samples. A "heel" of 20 lb. of iron remained in the cupola at the end of the operation due to cooling around the top hole. The spillage of iron during pouring amounted to an estimated 10 lb.

During the operation, the presence of free chlorine was noted at the slag and metal spouts during the pouring operations and in the water from the shower in the ventilating stack. A sample of the stack gas was aspirated out of the stack and passed through a trap cooled in solid carbon dioxide. A condensate was obtained in the trap which contained chlorinated hydrocarbons, phosphoric acid, water, carbonyl chloride and hydrogen chloride. The phosphoric acid and hydrogen chloride were thought to be due to the reaction of phosphorus oxychloride and water vapor contained in the hot stack gases upon cooling the latter. The presence of titanium and silicon compounds indicated the presence in the stack gas of volatile compounds of these elements.

Table I
CHARGES TO FURNACE

| Chg. No. | Coke (lb.) | Limestone (lb.) | Scrap iron (lb.) | Ore (lb.) | Character and Analysis of Ore ||||| Iron in ore (lb.) |
|---|---|---|---|---|---|---|---|---|---|---|
| | | | | | Iron as Fe (percent) | Ti as TiO₂ (percent) | P (percent) | S (percent) | Si as SiO₂ (percent) | |
| 1 | 24 | | 90 | | | | | | | |
| 2 | 24 | | 90 | | | | | | | |
| 3 | 24 | | 90 | | | | | | | |
| | | | | | (Massive Magnetite) ||||| |
| 4 | 24 | 2 | 18 | 18 | | | | | | |
| 5 | 24 | 2 | 18 | 18 | | | | | | |
| 6 | 24 | 2 | 18 | 18 | 60 | 7.5 | nil | nil | 0–0.3 | 32.4 |
| | | | | | (One-half Massive Magnetite) ||||| |
| | | | | | 60 | 7.5 | nil | nil | 0–0.3 | 16.2 |
| 7 | 24 | 2 | 18 | 18 | | | | | | |
| 8 | 24 | 2 | 18 | 18 | | | | | | |
| 9 | 24 | 2 | 18 | 18 | (One-half Ilmenite) ||||| |
| | | | | | 30 | 38 | nil | nil | | 8.1 |
| | | | | | (Ilmenite) ||||| |
| 10 | 24 | 2 | 18 | 18 | | | | | | |
| 11 | 24 | 2 | 18 | 18 | 30 | 38 | nil | nil | | 10.8 |
| | | | | | (One-half Massive Magnetite) ||||| |
| | | | | | 60 | 7.5 | nil | nil | | 5.4 |
| 12 | 24 | 2 | 18 | 18 | (One-half hard mixed ore—equivalent to ⅓ apatite, ⅔ magnetite) ||||| |
| | | | | | 40 | 5 | 6.2 | nil | | 3.6 |
| | | | | | (One-half frangible mixed ore—equivalent to ⅓ apatite and ⅔ magnetite) ||||| |
| | | | | | 40 | 5 | 6.2 | nil | | 3.6 |
| 13 | 54 | 1 | 18 | 18 | (One-half Massive Magnetite) ||||| |
| | | | | | 60 | 7.5 | nil | nil | | 5.4 |
| | | | | | (Frangible mixed ore—equivalent to ⅓ apatite and ⅔ magnetite) ||||| |
| 14 | 24 | 1 | 18 | 18 | 40 | 5 | 6.2 | nil | | 7.2 |
| 15 | 24 | 1 | 18 | 18 | (Hematite) ||||| |
| 16 | 24 | 1 | 18 | 18 | | | | | | |
| 17 | 24 | 1 | 18 | 18 | | | | | | |
| 18 | 24 | 1 | 18 | 18 | 50 | | | | | 36. |
| | | | | | (200 mesh concentrate) ||||| |
| 19 | 24 | 1 | 18 | 18 | 60 | 7.5 | | 5.7 | | 10.8 |
| Total Charged | 486 | 25 | 558 | 288 | | | | | | 139.5 |

The iron samples were analyzed, the results being given in Table II.

Table II
COMPOSITION OF SAMPLES

| Sample No. | Silicon, Percent | Manganese, Percent | Graphitic Carbon, Percent | Total Carbon, Percent | Phosphorus, Percent | Sulfur, Percent | Titanium, Percent |
|---|---|---|---|---|---|---|---|
| 1 | 1.47 | .22 | 1.66 | 3.27 | .389 | .204 | .11 |
| 2 | .92 | .20 | .16 | 3.32 | .359 | .172 | .09 |
| 3 | .63 | .14 | .06 | 3.01 | .334 | .166 | .07 |
| 4 | .54 | .12 | .05 | 2.96 | .311 | .178 | .07 |
| 5 | .41 | .08 | .06 | 3.21 | .346 | .207 | .05 |
| 6 | .17 | .04 | .05 | 3.18 | .586 | .267 | .04 |
| 7 | .16 | .04 | .07 | 2.86 | .836 | .276 | .04 |
| 8 | .16 | .02 | .06 | 2.75 | .953 | .307 | .07 |
| 9 | .10 | .02 | .08 | 2.91 | .740 | .147 | .11 |
| 10 | .12 | .02 | .06 | 3.02 | .646 | .320 | .08 |
| 11 | .85 | .04 | .12 | 3.05 | .462 | .352 | .07 |

The ingot corresponding to sample No. 10 in Table II, was tested for hardness. It was very difficult to cut and the cut surface had a Brinell hardness of 35 on the C scale. This hardness, coupled with the low silicon, phosphorus and sulfur content indicates the superior nature of iron made according to this process for casting purposes.

It is apparent from the example that the process can be operated using ores much higher in titanium and phosphorus than any which are usable in the conventional operation of a blast furnace and, at the same time, a free-flowing slag at a relatively low temperature can be formed and an iron exceptionally low in silicon, phosphorus, sulfur, manganese and titanium recovered which is superior to conventional pig iron for many purposes without further refining. It is significant to note that these results were obtained in a small cupola wherein the flow of molten iron was not more than six feet. This illustrates the ready and rapid removal by the vaporous sodium oxide of these substances, as well as of alumina and other "blocking agents" which tend to collect during the process on the surface of the ore and on the liquid iron. This is in contrast to the slower action of lime where slagging of these substances can occur only when they actually come into physical contact with the lime.

It is to be noted, also, that because of this action the use of costly metallurgical coke can often be avoided, the impurities in the coke being slagged as readily as those in the ore. In addition, it should be pointed out that hydride, nitride and cyanide formation is suppressed using the process, as compared with conventional processes, and this avoids embrittlement of the iron produced by these substances. These substances, if formed, are immediately decomposed to form harmless substances which are slagged off. Nitrides, for example, are converted to sodium nitride which is volatile and decomposed to form nitrogen at the temperatures involved.

A modification of the process comprises the generation of carbon monoxide or a mixture of carbon monoxide and hydrogen, e. g. by the combustion of low-grade coke, by cracking procedures, and the like, as a step in the process separate from the actual reduction step and the subsequent reduction of iron ores by introducing these reducing gases along with an alkali metal halide, and often with some air or purer oxygen, into a furnace containing the iron ore together, if desired, with lesser proportions of coke and limestone than those used conventionally. Following such procedures the capacity of a given furnace is increased greatly and the introduction of harmful substances contained in coke ash of even high quality into the furnace is substantially avoided.

It is apparent from the results obtained with the 19th charge that high sulfur ores can be reduced readily using the process described and from the results obtained with the 14th charge that high phosphorus ores can be reduced in using the process of the invention with the production of iron of usable quality. It is also apparent that the silicon, sulfur and phosphorus content of the iron produced from a given ore using the method described is lower and in approximately the order named, than when reducing the same ore using conventional procedures.

I claim:

1. In a process for recovering iron from an ore of high titanium content in which the iron in oxide form is reduced to its metallic state with a carbonaceous reducing agent at a temperature at which the iron formed is in its liquid state and a molten slag is formed and said liquid iron and molten slag are drawn off separately, the step of adding to said ore a fluxing agent consisting of limestone and an alkali metal halide, the amount of said alkali metal halide being sufficient to form a slag flowable at a temperature as low as 2370° F.

2. The process of claim 1 in which said process is carried out in a blast furnace and said fluxing agent is added to said furnace in the hot oxidizing region immediately above the molten slag.

3. The process of claim 1 in which said ore is ilmenite.

4. The process of claim 1 in which said alkali metal halide is sodium chloride.

References Cited in the file of this patent
UNITED STATES PATENTS

| | | |
|---|---|---|
| 96,872 | Blanchard | Nov. 16, 1869 |
| 188,078 | Sherman | Mar. 6, 1877 |
| 486,941 | Rossi | Nov. 29, 1892 |
| 2,417,101 | Campbell | Mar. 11, 1947 |
| 2,453,050 | Turbett | Nov. 2, 1948 |

FOREIGN PATENTS

| | | |
|---|---|---|
| No. 10 | Great Britain | of 1856 |
| 4,625 | Great Britain | of 1879 |

OTHER REFERENCES

Camp and Francis: The Making, Shaping and Treating of Steel, (5th ed.), pages 295–296 (1940).